A. P. BARRY.
Improvement in Plows.
No. 129,265.
Patented July 16, 1872.
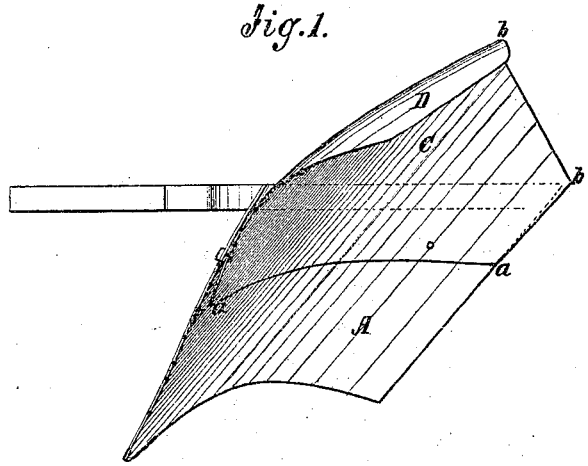
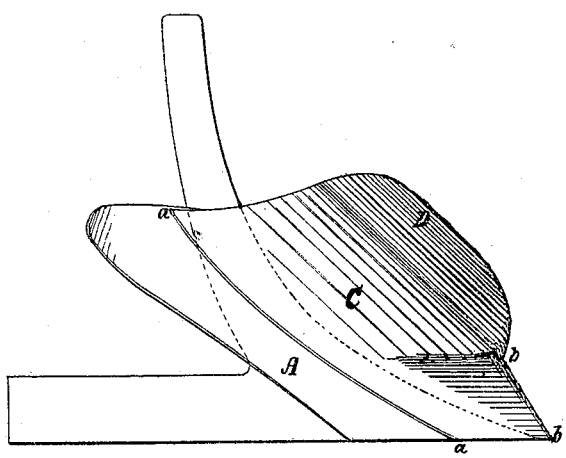
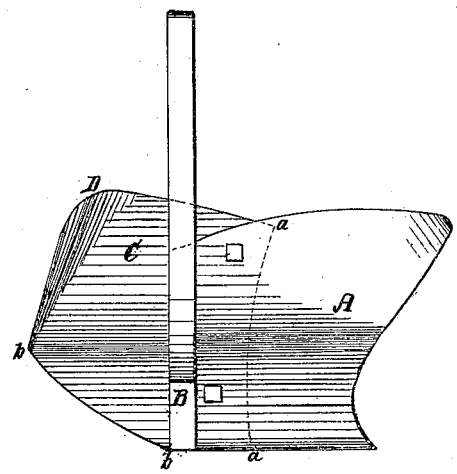

UNITED STATES PATENT OFFICE.

ANDREW P. BARRY, OF ASHLAND, MISSISSIPPI.

IMPROVEMENT IN PLOWS.

Specification forming part of Letters Patent No. 129,265, dated July 16, 1872.

*To all whom it may concern:*

Be it known that I, ANDREW P. BARRY, of Ashland, in the county of Copiah and State of Mississippi, have invented a new and Improved Scraper Attachment to Plows; and I do hereby declare that the following is a full, clear, and exact description thereof, which will enable others skilled in the art to make and use the same, reference being had to the accompanying drawing forming part of this specification.

This invention relates to improvements in scraper attachments to plows for scraping or "barring" off at the same time the cotton is plowed. It consists in a broad thin concave plate of metal attached to the mold-board at the front, and about midway between the junction of the mold-board with the land-side and the rear edge, extending from the share to the top of the said mold-board, and projecting beyond the land-side in the direction of the curvature of the mold-board, or thereabout, so as to make a kind of prolongation of the same for a considerable distance to scrape off the sloping surface of the ridge on which the cotton is planted, at the same time that the mold-board scrapes off the level surface over which it runs.

Figure 1 is a plan view of a plow with my improved scraper attachment. Fig. 2 is a rear elevation, and Fig. 3 is a side elevation looking from the right hand.

Similar letters of reference indicate corresponding parts.

A is the mold-board, and B the land-side of an ordinary turning-plow. C is the scraper attachment which I propose to apply. It consists of a broad thin plate of sheet metal, preferably steel, as wide as from the point to the top of the mold-board, and having the same curvature on the line *a a*, about the center of the said mold-board, where said plate C is riveted or otherwise attached to it, so as to project beyond the land-side in a kind of prolongation of the mold-board to the line *b b*, where it terminates; said line beginning at the end of the plow-point and running nearly perpendicular to it to the upper edge of said plate C, which is curved forward, as shown at D, to carry the weeds, grass, &c., back onto the mold-board to be cast off by it. The cutting-edge of said plate C rises from the point of the plow, on the line *b b*, abruptly and obliquely backward, so as to scrape off the sloping side of the ridge, while the bottom of the mold-board runs along the level surface in a way to do the work very much better than can be done by any other implement known to me.

Some plows have a long point, commonly called a duck-bill. To attach this scraper to such it is necessary to make an indenture or socket in which to enter the point of the scraper.

Having thus described my invention, I claim as new and desire to secure by Letters Patent—

The scraping or "barring"-off plate C attached to the mold-board of a plow, and arranged substantially as specified.

A. P. BARRY.

Witnesses:
   S. G. SALTER,
   V. A. HILBURN.